United States Patent [19]

Romano

[11] Patent Number: 4,878,884

[45] Date of Patent: Nov. 7, 1989

[54] REAR DERAILLEUR FOR BICYCLE GEARS

[75] Inventor: Antonio Romano, Padua, Italy

[73] Assignee: Campagnolo S.p.A., Venice, Italy

[21] Appl. No.: 238,427

[22] Filed: Aug. 31, 1988

[30] Foreign Application Priority Data

Sep. 4, 1987 [IT] Italy ................ 67761 A/87

[51] Int. Cl.$^4$ ............................................. F16H 11/08
[52] U.S. Cl. ...................................................... 474/82
[58] Field of Search ........................ 474/82, 79, 80, 78

[56] References Cited

U.S. PATENT DOCUMENTS

| 4,241,617 | 12/1980 | Nagano et al. | 474/82 |
|---|---|---|---|
| 4,267,744 | 5/1981 | Yamasaki | 474/82 X |
| 4,322,209 | 3/1982 | Shimano | 474/82 |
| 4,362,523 | 12/1982 | Huret | 474/82 |
| 4,403,978 | 9/1983 | Huret | 474/82 |
| 4,500,302 | 2/1985 | Crepin | 474/82 |
| 4,699,605 | 10/1987 | Jona | 474/82 |
| 4,731,045 | 3/1988 | Nagano | 474/82 X |

Primary Examiner—Thuy M. Bui
Attorney, Agent, or Firm—Sughrue, Mion, Zinn, Macpeak & Seas

[57] ABSTRACT

In a rear derailleur of the type including an articulated parallelogram joint, the axes of articulation of the two connecting rods of the articulated parallelogram to the upper body of the derailleur are inclined to the longitudinal plane of the bicycle in the position of mounting of the derailleur on the bicycle. These axes are also arranged with one outwardly of and higher than the other so that the plane containing them is also inclined to the axis of the rear wheel of the bicycle. It is possible to arrange for the lower body of the derailleur to be displaced when the chain is derailed, the chain transmission wheel being kept at a substantially constant distance from the sprocket which is engaged by the chain from time to time.

3 Claims, 1 Drawing Sheet

FIG. 1
FIG. 2
FIG. 3
FIG. 4
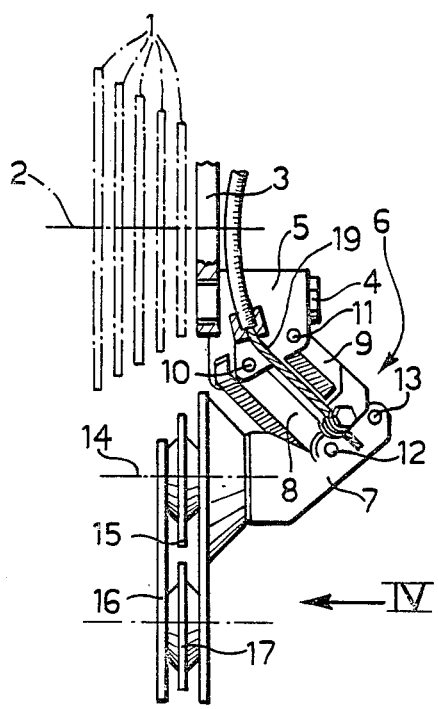
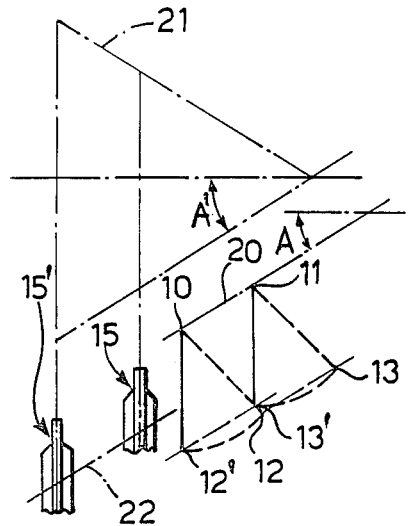
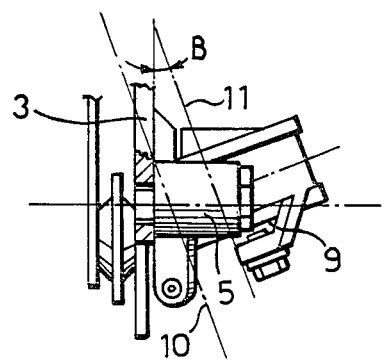
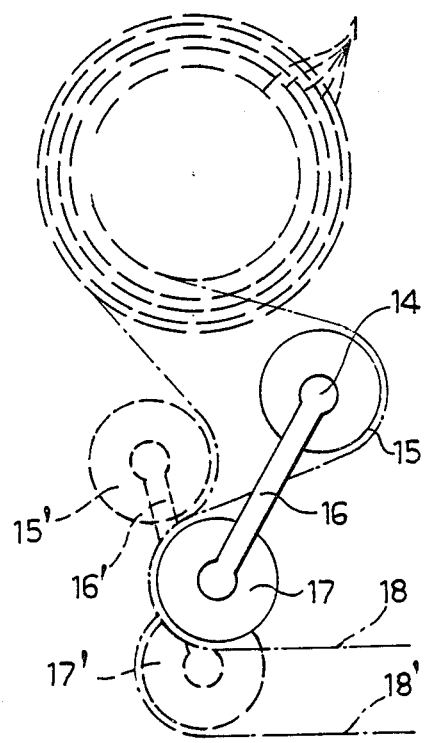

REAR DERAILLEUR FOR BICYCLE GEARS

BACKGROUND OF THE INVENTION

The present invention relates to rear derailleurs for bicycle gears, of the type comprising an upper body which can be fixed to the frame of the bicycle, a lower body carrying transmission means for the bicycle chain, and an articulated parallelogram joint which connects the lower body to the upper body, the joint including a pair of connecting rods whose ends are articulated to the upper body and to the lower body respectively.

SUMMARY OF THE INVENTION

The object of the present invention is to produce a derailleur which has a simple structure and at the same time ensures precise and reliable operation.

The main characteristic of the derailleur according to the invention lies in the fact that the axes of articulation of the two connecting rods of the articulated parallelogram joint to the upper body of the derailleur are inclined to the longitudinal plane of the bicycle in the position of mounting of the derailleur on the bicycle, and are also arranged with one outwardly of and higher than the other so that the plane containing the axes is inclined to the axis of the rear wheel of the bicycle.

Thus, when the chain is derailed, the movement of the lower body of the derailleur takes place with the chain transmission means being kept at a substantially constant distance from the sprocket which is engaged by the chain from time to time, to the benefit of the regular and correct functioning of the derailleur.

BRIEF DESCRIPTION OF THE DRAWINGS

Further characteristics and advantages of the present invention will become clear from the description which follows with reference to the appended drawings, provided by way of non-limiting example, in which:

FIG. 1 shows a rear view of the derailleur according to the invention,

FIG. 2 shows schematically the operating principle of the derailleur of FIG. 1,

FIG. 3 is a plan view of the derailleur of the FIG. 1, and

FIG. 4 is a schematic view on IV in FIG. 1.

DETAILED DESCRIPTION OF THE INVENTION

In FIG. 1 a series of sprockets, illustrated in broken outline in the drawing, is indicated 1 and is carried by the hub (not illustrated) of the rear wheel of a bicycle. The axis of the hub is indicated 2. The bicycle frame includes an appendage 3, adjacent the axis 2, which is used for the fixing of the upper body 5 of a derailleur 6 by means of a screw 4. The derailleur 6 also includes a lower body 7 which is connected to the upper body 5 by means of an articulated parallelogram joint. The articulated parallelogram joint includes two connecting rods 8, 9 which are articulated to the upper body 5 about axes 10, 11 and to the lower body 7 about axes 12, 13. The lower body 7 supports a chain transmission wheel 15 which is freely rotatable about an axis 14 parallel to the axis 2. A chain tensioning arm 16 is also articulated to the lower body 7 about the same axis 14 and terminates with a wheel 17 for engagement of the chain. According to conventional techniques, resilient means (not illustrated) are interposed between the lower body 7 and the chain tensioning arm 16 for biassing the arm 16 clockwise (with reference to FIG. 4) to keep the chain (indicated schematically by the broken line 18 in FIG. 4) tensioned. Again according to conventional techniques, resilient means (not illustrated) are interposed between the upper body 5 and one of the two connecting rods 8, 9 and/or between the lower body 7 and one of the two connecting rods 8, 9 for keeping the articulated parallelogram joint in the position illustrated in FIG. 1, in which the transmission wheel 15 is situated in the plane of the smallest sprocket 1. The articulated parallelogram joint can be moved from this position against the action of the resilient means by a flexible metal cable 19 operable by means of the gear lever (not illustrated).

As clearly shown in FIG. 2, the axes of articulation 10, 11 lie in a plane 20 which is inclined by an angle A (preferably between 20° and 40°) to the axis 2. This angle corresponds to approximately half the angle A' of opening of the imaginary cone 21 circumscribing the sprockets 1. In FIG. 2, the positions assumed by the articulation axes 12, 13 when the derailleur is in the condition which corresponds to engagement of the largest sprocket are indicated 12' and 13'. The reference numeral 15' in the same drawing indicates the position assumed by the transmission wheel 15 in the condition of engagement. As can be seen, during the movement from the position of engagement with the smallest sprocket to the position of engagement with the largest sprocket, the wheel 15 moves along a path which approximates to a straight line 22.

The articulation axes 10, 11, 12 and 13 also have an inclination B (FIG. 3)—between 10° and 30°—to the vertical longitudinal plane of the bicycle. As a result, when the transmission wheel 15 is brought into the position of engagement with the larger sprockets, it not only moves downwards, as is clear from FIG. 2, but also moves backwards with respect to the direction of travel of the bicycle, as is clear from FIG. 4 (where the positions of the transmission wheel 15 on engagement of the smallest sprocket and the largest sprocket are indicated in continuous outline and in broken outline respectively).

In conclusion, by virtue of the particular arrangement described above, the path along which the wheel 15 travels when the chain is derailed is such that the distance of the wheel 15 from the sprocket which is engaged from time to time by the chain is substantially constant. This enables regular and correct positioning of the derailleur.

Naturally, the principle of the invention remaining the same, the forms of embodiment and details of construction may be varied widely with respect to those described and illustrated purely by way of example, without thereby departing from the scope of the present invention.

What is claimed is:

1. A rear derailleur for bicycle gears, comprising an upper body which can be fixed to the bicycle frame, a lower body carrying transmission means for the bicycle chain, and an articulated parallelogram joint which connects the lower body to the upper body, the joint including a pair of connecting rods whose ends are articulated to the upper body and to the lower body respectively, wherein the axes of articulation of the two connecting rods to the upper body are inclined to the longitudinal plane of the bicycle in the position of mounting of the derailleur on the bicycle, and are arranged with one outwardly of higher than the other so that the plane containing the axes is inclined to the axis of the rear wheel of the bicycle.

2. A derailleur according to claim 1, wherein the plane containing the articulation axes is inclined to the axis of the bicycle wheel by an angle of between 20° and 40°.

3. A derailleur according to claim 1, wherein the articulation axes are inclined to the longitudinal plane of the bicycle by an angle of between 10° and 30°.

* * * * *